US011982426B1

(12) United States Patent
He et al.

(10) Patent No.: US 11,982,426 B1
(45) Date of Patent: May 14, 2024

(54) INTEGRATED INJECTION-MOLDED LIGHT AND MANUFACTURING METHOD THEREOF

(71) Applicant: Shenzhen Like Lighting Technology Co., Ltd., Shenzhen (CN)

(72) Inventors: Shijun He, Shenzhen (CN); Kun Li, Shenzhen (CN); Chao Xiong, Shenzhen (CN)

(73) Assignee: Shenzhen Like Lighting Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/518,635

(22) Filed: Nov. 24, 2023

Related U.S. Application Data

(63) Continuation of application No. PCT/CN2023/120682, filed on Sep. 22, 2023.

(30) Foreign Application Priority Data

May 31, 2023 (CN) ......................... 202310630985.5
May 31, 2023 (CN) ......................... 202310631000.0

(51) Int. Cl.

| | |
|---|---|
| ***F21V 15/01*** | (2006.01) |
| ***F21S 4/10*** | (2016.01) |
| ***F21V 23/00*** | (2015.01) |
| ***F21V 23/02*** | (2006.01) |
| *F21Y 105/16* | (2016.01) |

(Continued)

(52) U.S. Cl.
CPC .............. *F21V 15/013* (2013.01); *F21S 4/10* (2016.01); *F21V 23/002* (2013.01); *F21V 23/02* (2013.01); *F21Y 2105/16* (2016.08); *F21Y 2113/00* (2013.01); *F21Y 2115/10* (2016.08)

(58) Field of Classification Search
CPC ...... F21V 15/013; F21V 23/002; F21V 23/02; F21V 15/01; F21V 15/00; F21V 31/00; F21V 31/005; F21S 4/10; F21Y 2105/16; F21Y 2115/10; F21Y 2113/00
See application file for complete search history.

(56) References Cited

U.S. PATENT DOCUMENTS 9,777,892 B1 * 10/2017 Rowell ................. F21V 23/002
11,747,002 B1 * 9/2023 Xu ........................ F21V 23/001 362/249.14

(Continued)

*Primary Examiner* — Bao Q Truong
(74) *Attorney, Agent, or Firm* — Andrew C. Cheng

(57) ABSTRACT

An integrated injection-molded light includes a light source module and a power supply module. The light source module includes a case with a sealed cavity, a circuit board located in the sealed cavity, and illuminants and electronic components arranged on the circuit board. The power supply module includes a line tube, and a power supply line fixed in the line tube and electrically connected to the circuit board. The manufacturing method includes: electrically connecting the power supply line and the circuit board via a connecting conductive wire; and forming, through injection molding, the line tube that wraps around the power supply line and the case in which the circuit board, illuminants and electronic components are sealed. The case enclosing the circuit board, illuminants and electronic components and the line tube enclosing the power supply line are formed integrally through injection molding. Thus, the light is waterproof.

20 Claims, 10 Drawing Sheets

(51) Int. Cl.
*F21Y 113/00* (2016.01)
*F21Y 115/10* (2016.01)

(56) References Cited

U.S. PATENT DOCUMENTS

| | | | | |
|---|---|---|---|---|
| 2006/0035511 | A1* | 2/2006 | Mrakovich | F21V 29/713<br>439/404 |
| 2015/0369459 | A1* | 12/2015 | Huang | F21V 17/101<br>29/832 |

* cited by examiner

Placing, in a preset mold, a bottom plate, the power supply line and the circuit board which are electrically connected. — S21'

Injecting molten plastic material into the mold, and cooling the molten plastic material in the mold for a preset time to solidity the molten plastic material, thereby forming the line tube that wraps around the power supply line and cooperating with the bottom plate to form the case in which the circuit board and the illuminants are sealed. — S22'

FIG. 10

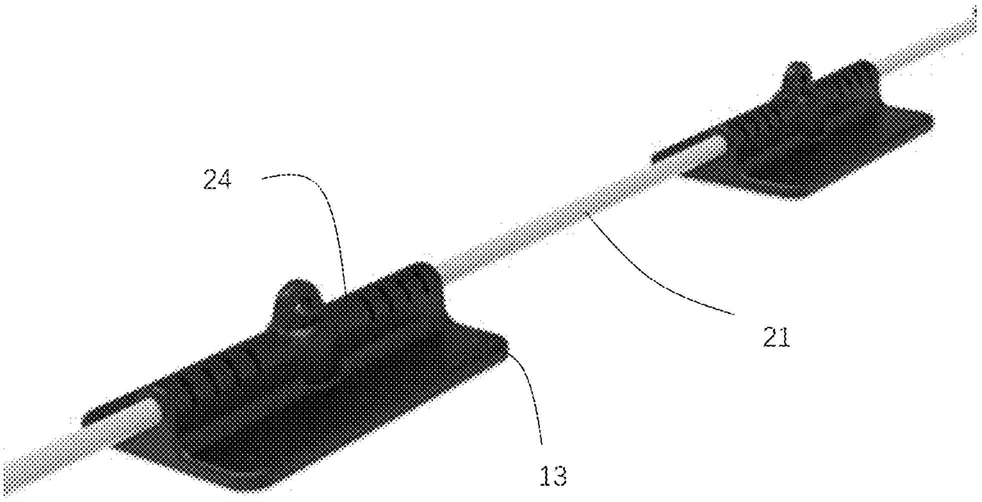

FIG. 11

INTEGRATED INJECTION-MOLDED LIGHT AND MANUFACTURING METHOD THEREOF

FIELD

The invention particularly relates to an integrated injection-molded light and a manufacturing method thereof.

BACKGROUND

Light strings are widely used in the modern lighting industry. A traditional light string is composed of a power supply line and a plurality of bulbs installed to the power supply line. Each bulb comprises a lamp holder, a lamp shade/shell and a lamp wick, and its production process is complex. There is a gap between the lamp holder and the lamp shade/shell, so the traditional light string is not waterproof, has potential safety hazards in use, and is high in failure rate and short in service life. In addition, when the traditional light string is used, users need to install the bulbs on the power supply line manually one by one, which is complex and inefficient. Therefore, it is of great significance to develop an improved light string with high water-proofness and user-friendliness.

SUMMARY

In one aspect, the present invention provides an integrated injection-molded light, which comprises a light source module comprising a case with a sealed cavity, a circuit board located in the sealed cavity, and illuminants mounted on the circuit board and located within the sealed cavity; and a power supply module comprising a line tube, and a power supply line fixed in the line tube and electrically connected to the circuit board. At least part of the case and the line tube are integrally formed through injection molding, such that the circuit board and the illuminants are completely sealed within the case.

In some embodiments, in a lengthwise direction of the power supply line, the line tube and the case are overlapped at least partially.

In some embodiments, in the lengthwise direction of the power supply line, the circuit board is overlapped with a part of the line tube, and in a direction perpendicular to the lengthwise direction of the power supply line, the circuit board is spaced apart from said part of the line tube.

In some embodiments, in the lengthwise direction of the power supply line, an end of the line tube is flush with an outer edge of the case.

In some embodiments, in the lengthwise direction of the power supply line, the outer edge of the case extends beyond the end of the line tube.

In some embodiments, the power supply module comprises a pair of line tubes and a connecting part located between the pair of line tubes, and the power supply line penetrates through the line tubes and the connecting part. The connecting part protrudes from the case in a direction away from the circuit board.

Preferably, the light further comprises a connecting conductive wire for connecting the power supply line and the circuit board, a through hole is formed in the circuit board, and the connecting conductive wire penetrates through the connecting part and the through hole of the circuit board and is then connected to the circuit board.

In some embodiments, a geometric centre line of the connecting part passes through a geometric centre of the case or the circuit board.

In some embodiments, in a direction perpendicular to the lengthwise direction the power supply line, the connecting part is wider than the line tubes.

In some embodiments, the illuminants are LED illuminants, the case is flat, central axes of the line tubes are parallel to the circuit board, and the connecting part is perpendicular to the circuit board.

In some embodiments, the case comprises a bottom plate and a cover plate which are located on opposite sides of the circuit board respectively; the cover plate, the line tubes and the connecting part are integrally formed from the same material; and the sealed cavity is formed between the bottom plate and the cover plate.

In some embodiments, the LED illuminants are installed on a surface, facing the bottom plate, of the circuit board, and light-emitting surfaces of the illuminants face the bottom plate.

In some embodiments, the lines tubes are spaced apart from the cover plate in a direction perpendicular to the circuit board.

In some embodiments, the line tubes and the cover plate are directly connected without a gap formed therebetween in the direction perpendicular to the case.

In some embodiments, the bottom plate, the cover plate, the lines tubes and the connecting part form an integrated structure through injection molding.

In some embodiments, the bottom plate is pre-formed, and the line tubes, the connecting part and the cover plate are fixedly connected to the bottom plate through injection molding.

In some embodiments, an L-shaped positioning step is arranged on a side, facing the cover plate, of the bottom plate, and an outer edge of the circuit board is located on an inner side of the positioning step.

In some embodiments, an inverted-L-shaped first clip is formed on the bottom plate, an L-shaped second clip is formed from the cover plate, and the first clip and the second clip are interlocked with each other.

In some embodiments, a suspension part is arranged at an end, away from the case, of the connecting part, and the suspension part is provided with a hook or a suspension hole.

In some embodiments, the light further comprises a pair of electric connectors respectively arranged at opposite two ends of the power supply line.

In some embodiments, multiple light source modules are fixed to the power supply line and distributed between the pair of electric connectors at intervals. Multiple light source modules are electrically connected to the power supply line in parallel.

In some embodiments, a plurality of rows of voids is formed in a tube wall of the line tube; and each row of voids extends in the lengthwise direction of the power supply line.

In another aspect, the present invention provides a manufacturing method of the integrated injection-molded light described above. The method comprises:

- S1: electrically connecting the power supply line and the circuit board by means of a connecting conductive wire; and
- S2: forming, through injection molding, the line tube that wraps around the power supply line and the case in which the circuit board and the illuminants are sealed.

In some embodiments, S2 comprises:

S21: placing, in a preset mold, the power supply line and the circuit board which are electrically connected; and S22: injecting molten plastic material into the mold, and cooling the molten plastic material in the mold for a preset time to solidity the molten plastic material, thereby forming the line tube that wraps around the power supply line and the case in which the circuit board and the illuminants are sealed.

In some embodiments, S2 comprises:

S21': placing, in a preset mold, a bottom plate, and the power supply line and the circuit board which are electrically connected; and S22': injecting molten plastic material into the mold, and cooling the molten plastic material in the mold for a preset time to solidity the molten plastic material, thereby forming the line tube that wraps around the power supply line and cooperating with the bottom plate to form the case in which the circuit board and the illuminants are sealed.

In some embodiments, an L-shaped positioning step is arranged on a side, facing the cover plate, of the bottom plate, and an outer edge of the circuit board is located on an inner side of the positioning step.

In some embodiments, an inverted-L-shaped first clip is formed on the bottom plate, an L-shaped second clip is formed from a cover plate of the case during the forming process of the cover plate, and the first clip and the second clip are interlocked with each other.

In some embodiments, the light further comprises electric connectors arranged at opposite ends of the power supply line, and multiple said light source modules are arranged between the electric connectors at intervals. The manufacturing method comprises:

Performing S1 multiple times to fixedly connect the circuit boards of the multiple light source modules to the power supply line at intervals; and Performing S2 multiple times to thereby form the cases and the lines tubes through injection molding one by one.

Compared with the prior art, the invention has the following beneficial effects:

The integrated injection-molded light has the following advantages: the water-proofness is better, and the case and the line tube are integrally formed through injection molding, such that the circuit board, illuminants and other electronic components are completely sealed in the case, thus effectively improving the water-proofness of the light and avoiding short circuits or other safety problems caused by the entry of rainwater or moisture; the appearance and shape of the light can be diversified as required, cases with various appearances and shapes can be formed through injection molding by means of molds with mold cavities in different shapes, thereby meeting personalized design requirements for different occasions and needs; and the production process is simple and the light source modules can be fixed to the power supply line though the manufacturing method based on integrated injection molding, thereby greatly shortening the production cycle, reducing the production cost, improving the production efficiency, and achieving user-friendliness (users do not need to manually install the light source modules on the power supply line when using the light).

Other aspects and advantages of the invention will be partially given in the following description, and partially become obvious in the following description or be understood in the practice of the invention.

BRIEF DESCRIPTION OF THE DRAWINGS

To more clearly explain the technical solutions of the embodiments of the invention or the prior art, drawings used for describing the embodiments of the invention or the prior art will be briefly introduced below. Obviously, the drawings in the following description are merely for some embodiments of the invention, and those ordinarily skilled in the art can obtain other drawings according to the following ones without creative labour.

FIG. 9 and FIG. 10 are schematic flowcharts of S2 of the manufacturing method of the integrated injection-molded light according to different embodiments of the invention.

FIG. 11 is a schematic diagram of multiple light source modules installed on one power supply line.

DESCRIPTION OF THE EMBODIMENTS

Figure 1:
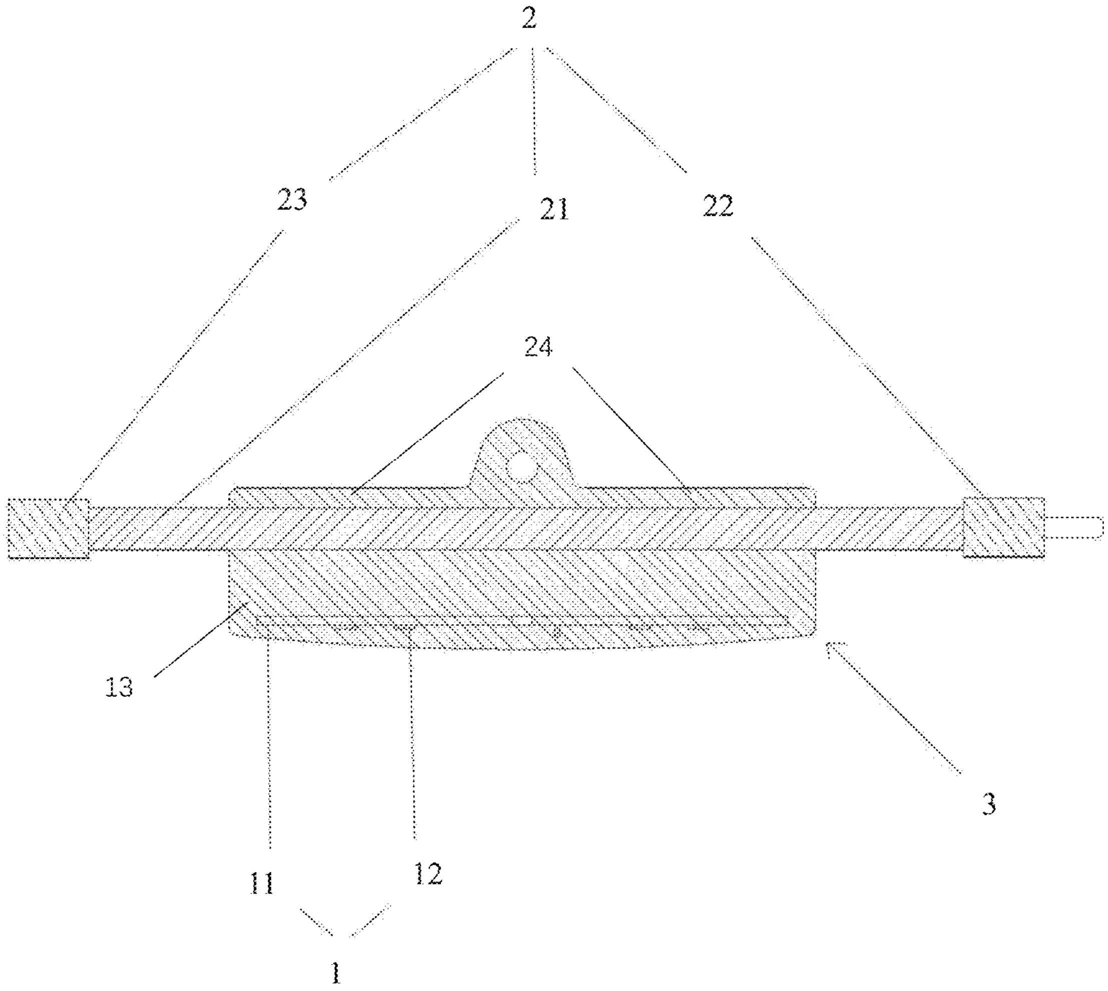
FIG. 1 is a sectional structural view of an integrated injection-molded light according to an embodiment of the invention.

The technical solutions of the embodiments of the invention will be clearly and completely described below. Obviously, the embodiments in the following description are merely illustrative ones, and are not all possible ones of the invention. All other embodiments obtained by those ordinarily skilled in the art based on the following ones without creative labour should fall within the protection scope of the invention.

In the description of the invention, it should be noted that terms such as “centre”, “upper”, “lower”, “left”, “right”, “vertical”, “horizontal”, “inner” and “outer” are used to indicate directional or positional relations based on the accompanying drawings merely for the purpose of facilitating and simplifying the description of the invention, do not indicate or imply that devices or elements referred to must be in a specific direction, or be configured and operated in a specific direction, and thus should not be construed as limitations of the invention.

In addition, in the description of the invention, unless otherwise expressly stated and defined, terms such as “mount”, “link” and “connect” should be broadly understood. For example, “connect” may refer to fixed connection, detachable connection or integrated connection; or, mechanical connection or electrical connection; or, direct connection, indirect connection through an intermediate medium or internal connection of two elements; or wired connection or wireless connection. Those ordinarily skilled in the art can appreciate the specific meanings of these terms in the invention as the case may be.

In addition, technical features involved in different embodiments of the invention described below can be combined without conflicts.

Referring to FIG. 1-FIG. 5, according to an embodiment of the invention, an integrated injection-molded light 3 comprises a light source module 1 and a power supply module 2.

The light source module 1 comprises a circuit board 11, a plurality of illuminants 12 and a plurality of electronic components 122 (FIG. 7) arranged on the circuit board 11, and a case 13 enclosed the circuit board 11, the plurality of illuminants 12 and the plurality of electronic components 122 therein. In this embodiment, the illuminants 12 may be LED illuminants. A control circuit is arranged on the circuit board 11 and configured for controlling the brightness of the LED illuminants 12. The circuit board 11 is preferably made from a metal substrate such as an aluminum substrate. Of course, the circuit board 11 may also be made from other materials such as a fiberglass substrate. The LED illuminants 12 are key parts for emitting light, and compared with bulbs, have the advantages of energy saving, long service life and high brightness. The case 13 encloses/wraps around the circuit board 11, the LED illuminants 12 and the electronic components 122 therein, such that the circuit board 11, the LED illuminants 12 and the electronic components 122 are well sealed.

It can be understood that the circuit board 11 may be in various shapes such as a circular shape, an oval shape, a square shape, a rectangular shape and a triangular shape, and the shape of the case 13 may be identical with the shape of the circuit board 11, that is, the case 13 may be in a circular shape, an oval shape, a square shape, a rectangular shape, a triangular shape, or the like, which depends on the application scenario. It can be understood that the shape of the case 13 may be different from the shape of the circuit board 11 in some embodiments. For example, a circular circuit board 11 may be arranged within a square case 13, or a square circuit board 11 may be arranged within a circular case 13. The invention has no limitation in this aspect.

Figure 2A:
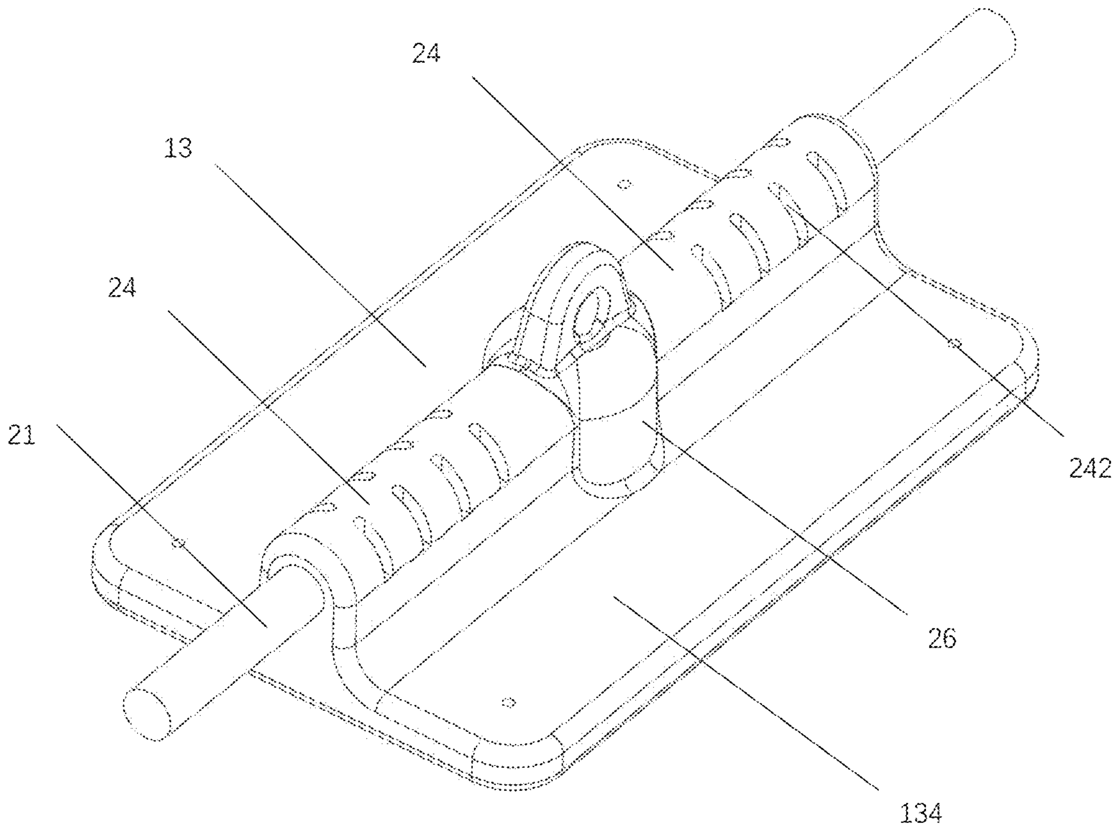
FIG. 2A is a three-dimensional structural view of the integrated injection-molded light according to an embodiment of the invention.
Figure 2B:
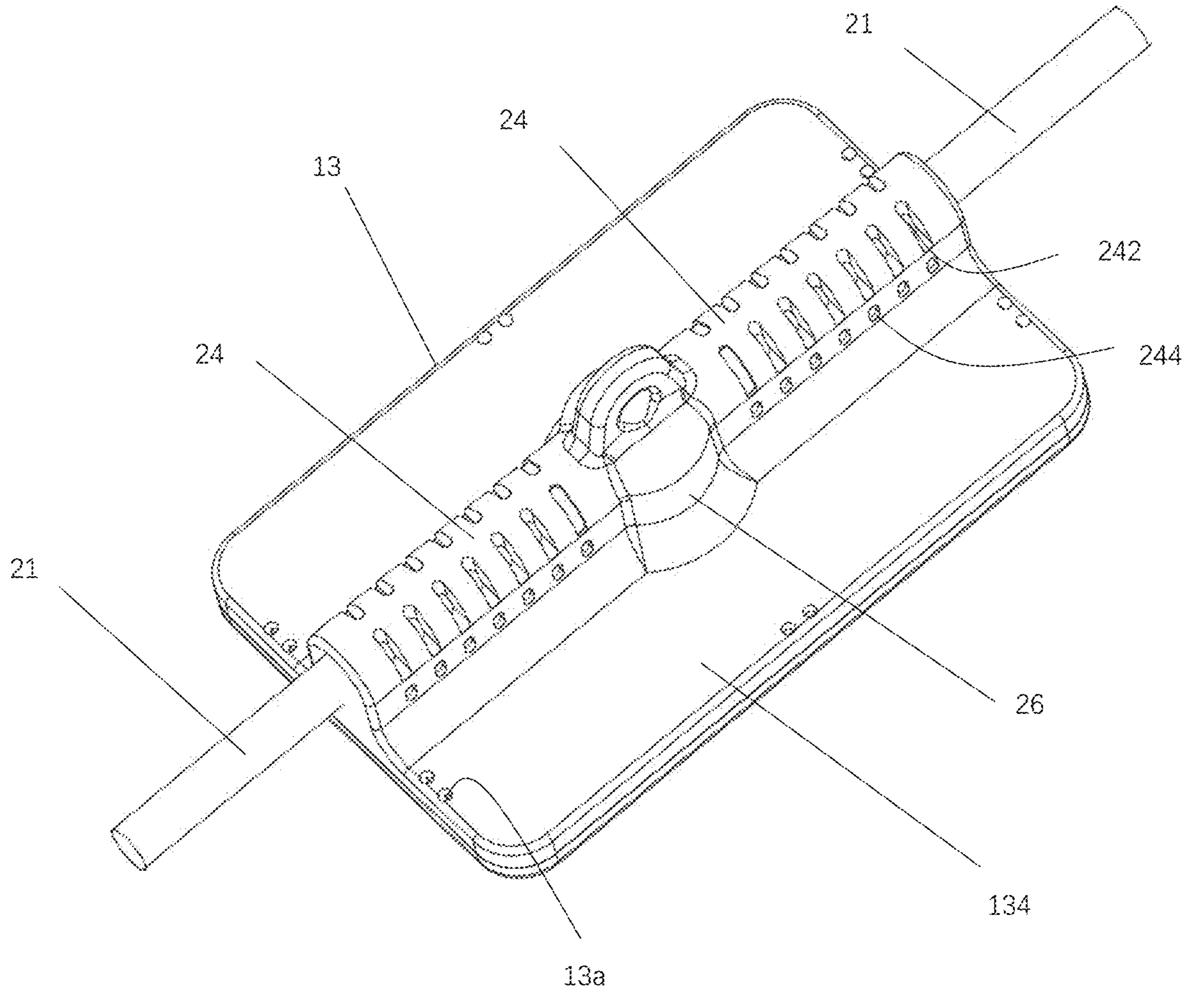
FIG. 2B is a three-dimensional structural view of the integrated injection-molded light according to another embodiment of the invention.
Figure 3:
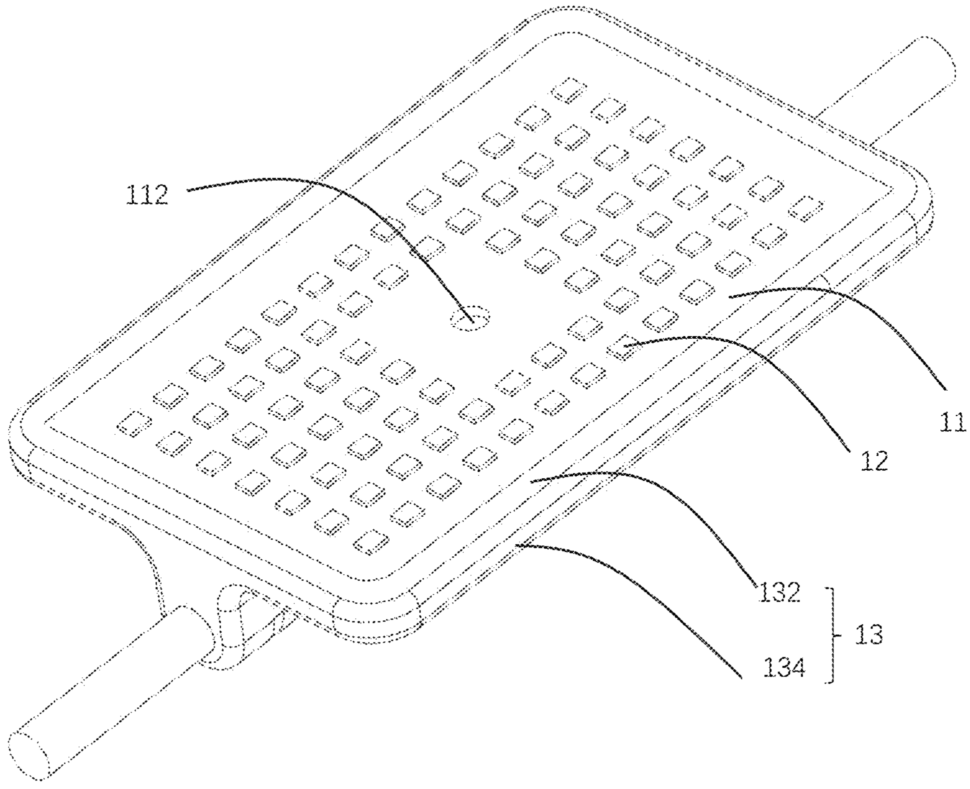
FIG. 3 is a three-dimensional structural view of the light shown in FIG. 2A, viewed from another perspective.
Figure 5:
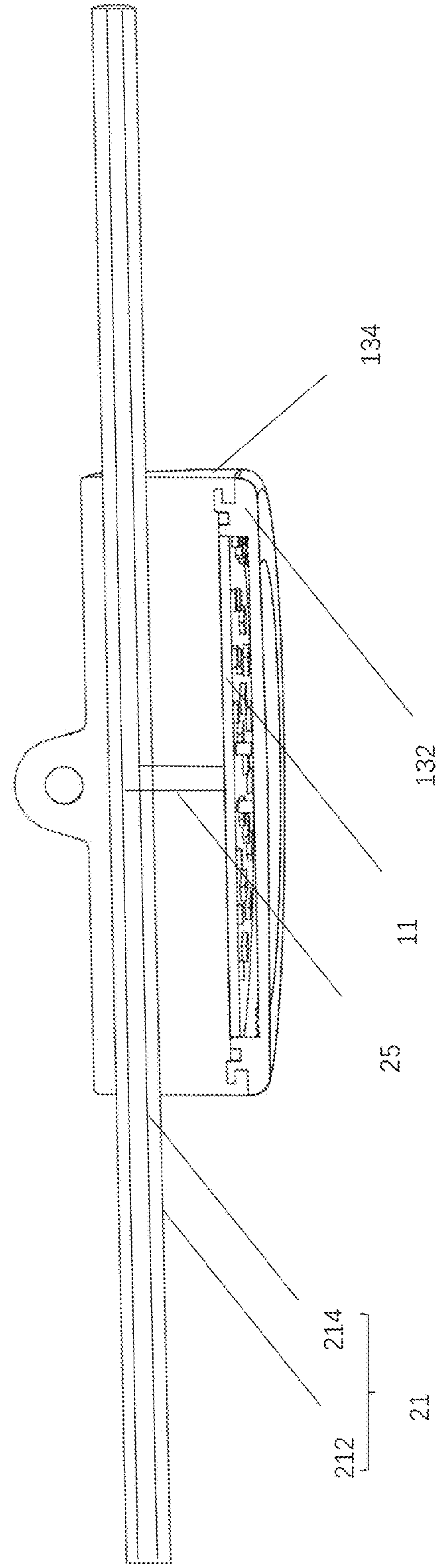
FIG. 5 is a sectional structural view of the integrated injection-molded light according to another embodiment of the invention.

The power supply module 2 comprises a line tube 24 and a power supply line 21 fixed in the line tube 24. The power supply line 21 is electrically connected to a power source and the circuit board 11 in order to supply power to the LED illuminants 12 and the electronic components 122 through the circuit board 11. The power supply line 21 may be electrically connected to the circuit board 11 through a thin connecting conductive wire 25 (FIG. 5). Specifically, as shown in FIG. 5, the power supply line 21 comprises an insulating sheath 212 and a plurality of conductive wire cores 214 located in the insulating sheath 212. The insulating sheath 212 at a joint of the power supply line 21 and the connecting conductive wire 25 is stripped to expose the conductive wire cores 214. One end of the connecting conductive wire 25 is fixedly connected to the conductive wire cores 214, and the other end of the connecting conductive wire 25 is fixedly and electrically connected to the circuit board 11, such that the power supply line 21 is electrically connected to the circuit board 11. The insulating sheath 212 of the power supply line 21 is made from a waterproof material, such that the circuit board 11, the LED illuminants 12 and the electronic components 122 are effectively protected against dampness. As shown in FIG. 3, a plurality of voids 242 such as grooves, slots or openings, is formed in a tube wall of the line tube 24 for improving the swing performance of the tube wall of the line tube 24 and protecting the part of the power supply line 21 embedded in the line tube 24 from being damaged during swing of the light source module 1 relative to the power supply line 21. The voids 242 are arranged in one or multiple rows, and each row comprises a plurality of voids which are arranged along the lengthwise direction of the power supply lines 21 at intervals. Preferably, the voids 242 are arc and around the power supply line 21. Referring to FIG. 2B, in addition to the voids 242, a plurality of additional voids such as notches/holes 244 may be formed in the tube wall of the line tube 24 for further improving the swing performance of the tube wall of the line tube 24 and protecting the part of the power supply line 21 embedded in the line tube 24 from being damaged during swing of the light source module 1 relative to the power supply line, and the plurality of notches 244 are arranged in one row along the lengthwise direction of the power supply line 21. Preferably, a plurality of positioning holes **13*a* may be formed in the case 13** to allow positioning pillars to penetrate through in the forming process.

In some embodiments, at least part of the case 13 of the light source module 1 and the line tube 24 are integrally formed through injection molding. That is, through injection molding, the line tube 24 around the power supply line 21 is formed, and the circuit board 11, the LED illuminants 12 and the electronic components 122 are enclosed and sealed within the case 13.

In some embodiments, in an extension/lengthwise direction of the power supply line 21, the power supply module comprises a pair of line tubes 24 and a connecting part 26 located between the line tubes 24, wherein the power supply line 21 penetrates through the line tubes 24 and the connecting part 26. The connecting part 26 protrudes from the case 13 in a direction away from the circuit board 11. Preferably, the connecting part 26 exactly faces the geometric centre of the case 13, and a geometric centre line of the connecting part 26 passes through the geometric centre of the case 13. In a case where the case 13 is circular or oval, the geometric centre line of the connecting part 26 passes through the centre of the circular or oval case 13, and the pair of line tubes 24 extend from opposite sides of the outer circumferential wall of the connecting part 26 in opposite directions along the diameter of the circular case 13 or long edges of the oval case 13. The pair of line tubes 24 may have the same length or different lengths. In a case where the case 13 is square, the geometric centre line of the connecting part 26 passes through the centre of the square case 13, and the pair of line tubes 24 extend from opposite sides of the outer circumferential wall of the connecting part 26 in opposite directions parallel to long edges of the square case 13.

As shown in FIG. 5, the connecting conductive wire 25 extends from the conductive wire cores 214 of the power supply line 21, penetrates through the connecting part 26, and is then physical and electrically connected to the circuit board 11. The connecting conductive wire 25 and the joints between the connecting conductive wire 25 and the conductive wire cores 214 are sealed by the connecting part 26.

In some embodiments, the case 13 is flat and is basically parallel to the circuit board 11, the central axes of the line tubes 24 are basically parallel to the circuit board 11, the connecting part 26 is basically perpendicular to the circuit board 11, and the geometric centre line of the connecting part 26 passes through the centre of the circuit board 11.

In some embodiments, the case 13 comprises a bottom plate 132 and a cover plate 134 which are located on opposite sides of the circuit board 11 respectively, a sealed cavity 135 is formed between the bottom plate 132 and the cover plate 134, and the circuit board 11 and the plurality of LED illuminants 12 are located within the sealed cavity 135 and therefore sealed by the case 13. The cover plate 134, the line tubes 24 and the connecting part 26 are formed integrally, and a surface, away from the bottom plate 132, of the circuit board 11 is fixedly connected to the cover plate 134. The connecting part 26 protrudes from the cover plate 134 in a direction away from the bottom plate 132. In some embodiments, the line tubes 24 and the connecting part 26 protrude from the cover plate 134 in a direction away from the bottom plate 132. The bottom plate 132 of the case 13 may be made from a transparent material, or a non-transparent frosted or milky white material. The LED illuminants 12 are arranged on a side, facing the bottom plate 132, of the circuit board 11, light-emitting surfaces of the LED illuminants 12 face the bottom plate 132, and light emitted by the LED illuminants 12 penetrates through the bottom plate 132 and is then irradiated out of the case 13. A through hole 112 (FIG. 7) is formed in the circuit board 11, and the connecting conductive wires 25 penetrating through the through hole 112 are connected to a circuit on the circuit board 11.

In some embodiments, the bottom plate 132, the cover plate 134, the line tubes 24 and the connecting part 26 form an integrated structure through injection molding, that is, the bottom plate 132, the cover plate 134, the line tubes 24 and the connecting part 26 are simultaneously formed into an integrated structure from the same material using the same mold (also referred to as a full-wrapped structure, that is, the circuit board and the illuminants are completely wrapped and sealed by injection-molding materials). The specific forming method will be described in detail below.

Figure 4:
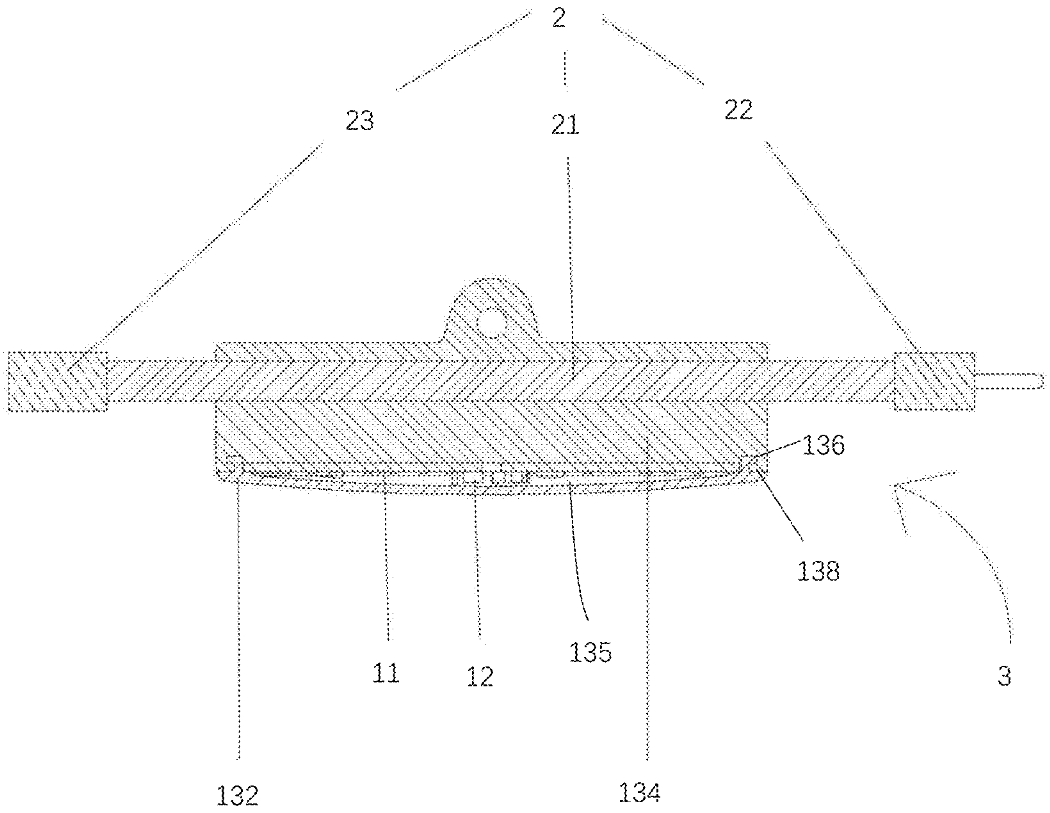
FIG. 4 is a sectional structural view of the integrated injection-molded light according to another embodiment of the invention.

Referring to FIG. 4, in some other embodiments, the bottom plate 132 is formed separately from the cover plate 134, the line tubes 24 and the connecting part 26 (also referred to as a half-wrapped structure, that is, the bottom plate 132 is pre-formed, and injection-molding materials for forming the cover plate 134, the line tubes 24 and the connecting part 26 merely wrap and seal a part of the circuit board and the illuminants, and the other part of the circuit board and the illuminants is wrapped and sealed by the bottom plate 132). After the circuit board 11 is mounted on the bottom plate 132, the cover plate 134, the line tubes 24 and the connecting part 26 are formed through injection molding, and the cover plate 134, the line tubes 24 and the connecting part 26 are fixedly connected to the pre-formed bottom plate 132 during the forming process. The specific forming method will be described in detail below. Preferably, an inverted-L-shaped first clip 136 is formed on the bottom plate 132 at a joint of the bottom plate 132 and the cover plate 134, an L-shaped second clip 138 is formed from the cover plate 134 in the forming process of the cover plate 134. The first clip 136 and the second clip 138 are engaged/interlocked with each other, thereby enhancing the connection strength between the cover plate 134 and the bottom plate 132. In other embodiments, the second clip 138 of the cover plate 134 extends in a circumferential direction of the cover plate 134 to form a wrapping edge in which the periphery of the bottom plate 132 is wrapped, thereby realizing the fixed connection between the cover plate 134 and the bottom plate 132.

In some embodiments, the line tubes 24 and the cover plate 134 are directly connected without a gap formed therebetween in a direction perpendicular to the circuit board 11. For example, the middle of the cover plate 134 protrudes in a direction away from the bottom plate 132 to form the line tubes 24. The cross-section of the combination of the line tubes 24 and the cover plate 134 in the extension/lengthwise direction of the power supply line 21 is in a S2 shape.

Figure 6:
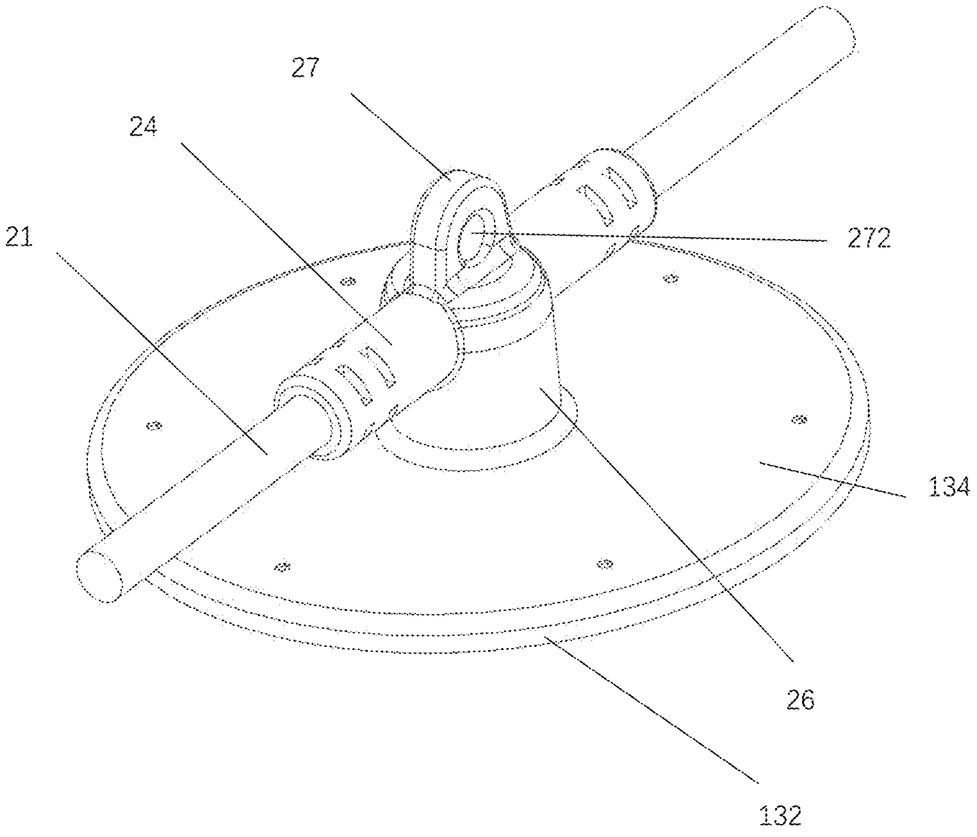
FIG. 6 is a three-dimensional structural view of the integrated injection-molded light according to another embodiment of the invention.
Figure 7:
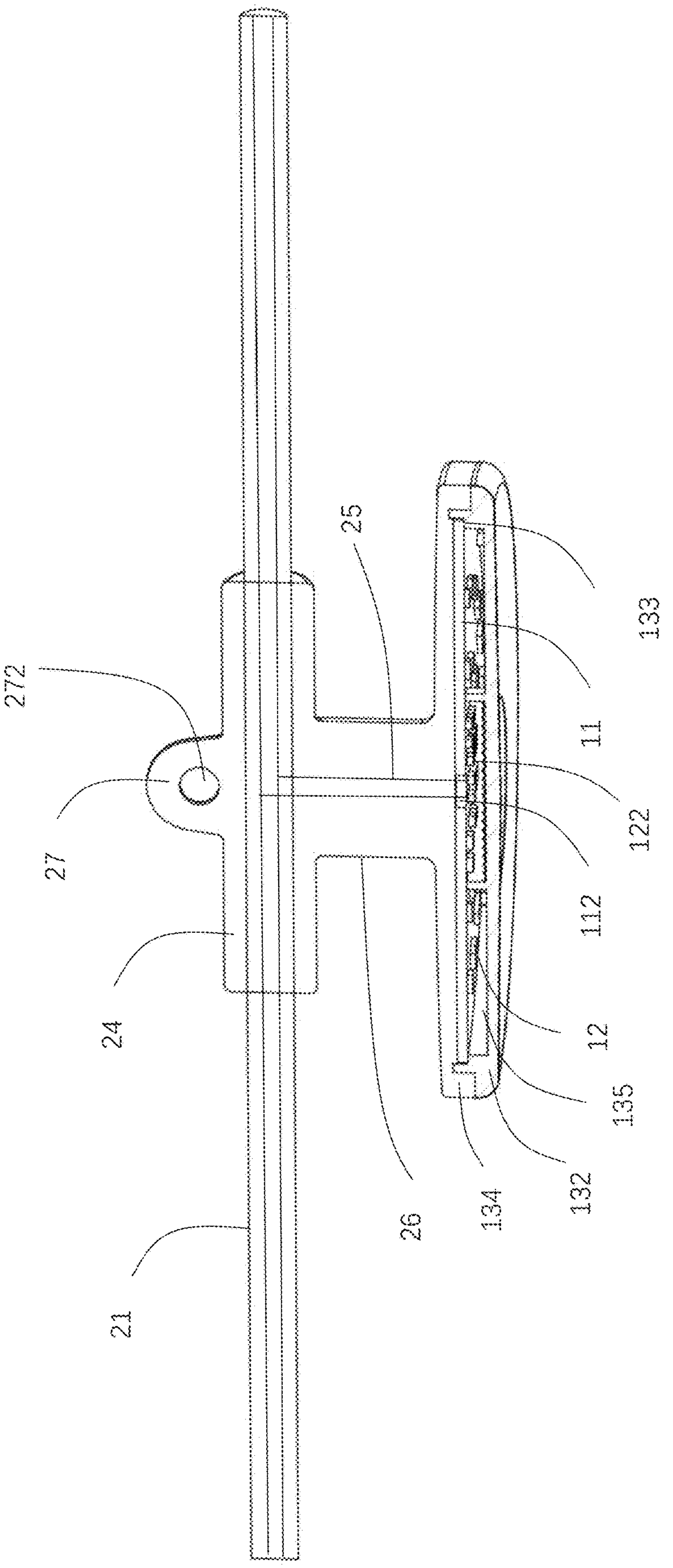
FIG. 7 is a sectional view of FIG. 6.

Referring to FIG. 6 and FIG. 7, in some other embodiments, the line tubes 24 are spaced apart from the cover plate 134 in a direction perpendicular to the circuit board 11, that is, the line tubes 24 are connected to the cover plate 134 through the connecting part 26. For example, the pair of line tubes 24 extend from opposite sides of an upper portion of the connecting part 26 in a direction parallel to the circuit board 11.

A suspension part 27 is arranged at an end, away from the case 13, of the connecting part 26, and the suspension part 27 is provided with a hook or a suspension hole 272, such that the light can be suspended in a corresponding application scenario.

A manufacturing method of the integrated injection-molded LED light will be described in detail below.

Figure 8:
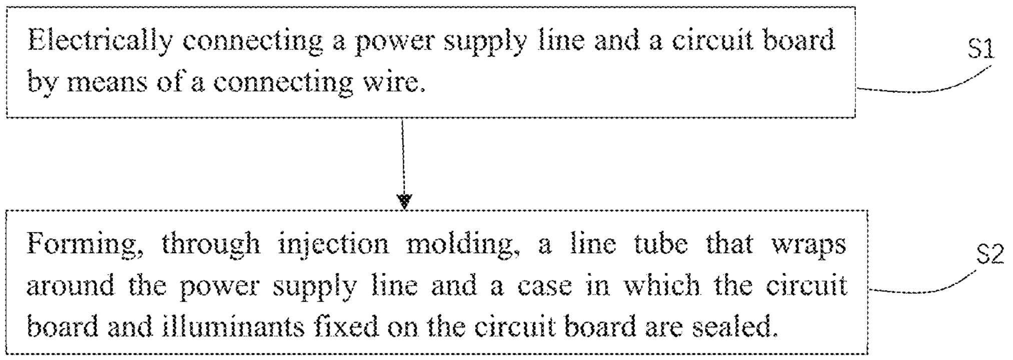
FIG. 8 is a flow diagram of a manufacturing method of the integrated injection-molded light according to an embodiment of the invention.

Referring to FIG. 8, the manufacturing method comprises the following steps:

S1: electrically connecting the power supply line and the circuit board by means of the connecting conductive wire; and S2: integrally forming, through injection molding, the line tube 24 that wraps around the power supply line 21 and the case 13 in which the circuit board 11 and the illuminants 12 fixed on the circuit board 11 are sealed.

Specifically, in S1, two ends of the connecting conductive wire are physically connected to the power supply line 21 and the circuit board 11 through welding or other methods to realize electrical connection between the power supply line 21 and the circuit board 11.

Figure 9:
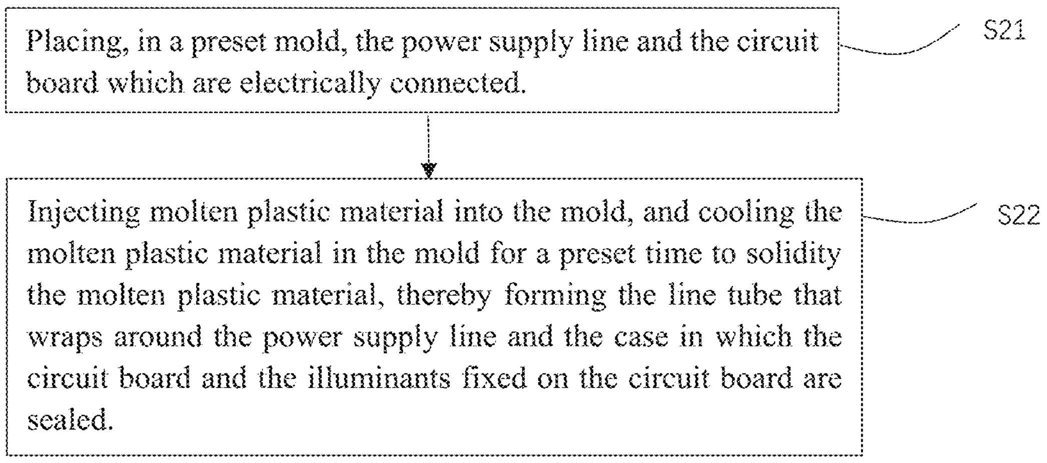

Referring to FIG. 9, in a case of adopting the full-wrapped structure, S2 specifically comprises:

S21: placing, in a mold cavity of a preset mold, the power supply line 21 and the circuit board 11 which are electrically connected; and S22: closing the mold to perform injection molding, that is, injecting molten plastic material into the mold until the mold cavity of the mold is fully filled with the molten plastic material; then, opening the mold for cooling, that is, cooling an injection-molded light 3 in the mold for a period of time to solidify the material and obtain desired hardness, thereby forming the line tube that wraps around the power supply line and the case in which the circuit board and the illuminants fixed on the circuit board are sealed, and in a case where the power supply module has a connecting part between a pair of line tubes, forming the connecting part in this step; and finally, taking out the injection-molded light 3 which is fixed to the power supply line 21.

Referring to FIG. 10, in a case of adopting the half-wrapped structure, S2 specifically comprises:

S21': placing, in a mold cavity of a preset mold, the bottom plate 132, and the power supply line 21 and the circuit board 11 which are electrically connected, wherein as shown in FIG. 7, an L-shaped positioning step 133 may be arranged on a side, facing a cover plate 134, of the bottom plate 132, and an outer periphery/edge of the circuit board 11 is located on an inner side of the positioning step 133; and S22': next, closing the mold to perform injection molding, that is, injecting molten plastic material into the mold until the mold cavity of the mold is fully filled with the molten plastic material; then, opening the mold for cooling, that is, cooling an injection-molded light 3 in the mold for a period of time to solidify the light 3 and obtain desired hardness, thereby forming the line tube that wraps around the power supply line and the case which is formed together with the bottom plate and in which the circuit board and the illuminants on the circuit board are sealed, and in a case where the power supply module has a connecting part between a pair of line tubes, forming the connecting part in this step; and finally, taking out the injection-molded light 3. In a case of the half-wrapped structure, the bottom plate 132 is pre-formed, for example, by injection molding before the line tube 24 and the cover plate 134 are formed, so in this case, injection molding needs to be performed twice, the bottom plate 132 is formed during the first injection molding, and the cover plate 134, the line tubes 24 and the connecting part 26 are formed during the second injection molding.

Referring to FIG. 1, FIG. 4 and FIG. 11, the light further comprises electric connectors arranged at two ends of the power supply line, such as a plug 22 and a socket 23. Multiple power supply lines 21 with light source modules mounted thereon may be connected in series through the plugs 22 and sockets 23 to form a light string, users can adjust the number of lights 3 connected in series and the length of the light string as required, the lights 3 can be installed and detached more conveniently, and users can customize various appearance designs of the lights 3 according to different requirements.

It can be understood that multiple light source modules may be fixedly connected to the same power supply line 21 between the plug 22 and the socket 23, that is, multiple light source modules may be arranged on the same power supply line 21 at intervals. Multiple light source modules may be electrically connected to the power supply line 21 in parallel. During production, all the circuit boards 11 of multiple light source modules are welded to the power supply line 21 first, then the cases 13 and the line tubes 24 of the multiple light source modules are formed one by one through injection molding or multiple cases 13 and line tubes 24 are formed in multiple mold cavities at the same time; or, after one circuit board 11 is welded, one case 13 and one line tube 24 are formed through injection molding, the next circuit board 11 is then welded, and then the next case 13 and the next line tube 24 are formed through injection molding.

With the improvement of people's environmental awareness and the constant strengthening of the national environmental protection policy, more and more customers begin to pay attention to the energy conservation and environmental friendliness of products. The light provided by the invention not only can save energy, but also is water-proof, can be suspended on a fixed support such as a wall or a beam when used (users do not need to install bulbs on the power supply line manually one by one like in the prior art), and is convenient to use and suitable for indoor and outdoor occasions and construction sites, thus having a broad market prospect.

Those skilled in the art should appreciate that the invention is not limited to the details of the above illustrative embodiments, and can be implemented in other specific forms without departing from the spirit or basic features of the invention. Therefore, from any point of view, the above embodiments should be considered as illustrative and non-restrictive, the scope of the invention should be defined by the appended claims rather than the above description, and the invention is intended to include all modifications made within the scope of the claims and their equivalents.

What is claimed is:

1. An integrated injection-molded light, comprising:

a light source module comprising a case with a sealed cavity, a circuit board located in the sealed cavity, and illuminants mounted on the circuit board and located within the sealed cavity; and a power supply module comprising a line tube, and a power supply line fixed in the line tube and electrically connected to the circuit board;

wherein at least part of the case and the line tube are integrally formed through injection molding, such that the circuit board and the illuminants are completely sealed within the case.

2. The integrated injection-molded light according to claim 1, wherein the power supply module comprises a pair of said line tubes and a connecting part located between the pair of said line tubes, the power supply line penetrates through the line tubes and the connecting part, and the connecting part protrudes from the case in a direction away from the circuit board.

3. The integrated injection-molded light according to claim 2, wherein a suspension part is arranged at an end, away from the case, of the connecting part for hanging the light.

4. The integrated injection-molded light according to claim 2, wherein the light further comprises a connecting conductive wire for connecting the power supply line and the circuit board, a through hole is formed in the circuit board, and the connecting conductive wire penetrates through the connecting part and the through hole of the circuit board and is then connected to the circuit board.

5. The integrated injection-molded light according to claim 2, wherein the illuminants are LED illuminants, the case is flat, central axes of the line tubes are parallel to the circuit board, and the connecting part is perpendicular to the circuit board.

6. The integrated injection-molded light according to claim 2, wherein the case comprises a bottom plate and a cover plate which are located on opposite sides of the circuit board respectively;

the cover plate, the line tubes and the connecting part are integrally formed from the same material; and the sealed cavity is formed between the bottom plate and the cover plate.

7. The integrated injection-molded light according to claim 6, wherein the lines tubes are spaced apart from the cover plate in a direction perpendicular to the circuit board; or the line tubes and the cover plate are directly connected without a gap formed therebetween in the direction perpendicular to the circuit board.

8. The integrated injection-molded light according to claim 6, wherein the bottom plate, the cover plate, the lines tubes and the connecting part form an integrated structure through injection molding; or the bottom plate is pre-formed, and the line tubes, the connecting part and the cover plate are then fixedly connected to the bottom plate through injection molding.

9. The integrated injection-molded light according to claim 8, wherein an L-shaped positioning step is arranged on a side, facing the cover plate, of the bottom plate, and an outer edge of the circuit board is located on an inner side of the positioning step; or an inverted-L-shaped first clip is formed on the bottom plate, an L-shaped second clip is formed from the cover plate, and the first clip and the second clip are interlocked with each other.

10. The integrated injection-molded light according to claim 1, wherein in a lengthwise direction of the power supply line, the line tube and the case are overlapped at least partially; or in the lengthwise direction of the power supply line, the circuit board is overlapped with a part of the line tube, and in a direction perpendicular to the lengthwise direction of the power supply line, the circuit board is spaced apart from said part of the line tube.

11. The integrated injection-molded light according to claim 10, wherein in the lengthwise direction of the power supply line, an end of the line tube is flush with an outer edge of the case; or in the lengthwise direction of the power supply line, the outer edge of the case extends beyond the end of the line tube.

12. The integrated injection-molded light according to claim 1, wherein the light further comprises a pair of electric connectors respectively arranged at opposite ends of the power supply line.

13. The integrated injection-molded light according to claim 12, wherein multiple said light source modules are fixed to the power supply line and distributed between the pair of electric connectors at intervals.

14. The integrated injection-molded light according to claim 1, wherein a plurality of rows of voids is formed in a tube wall of the line tube for improving swing performance of the tube wall of the line tube, and each row of voids extends in a lengthwise direction of the power supply line.

15. The integrated injection-molded light according to claim 1, wherein a plurality of arc voids around the power supply line is formed in in a tube wall of the line tube for improving swing performance of the tube wall of the line tube.

16. A manufacturing method of the integrated injection-molded light according to claim 1, comprising:

S1: electrically connecting the power supply line and the circuit board by means of a connecting conductive wire; and S2: forming, through injection molding, the line tube that wraps around the power supply line and the case in which the circuit board and the illuminants are sealed.

17. The manufacturing method of the integrated injection-molded light according to claim 16, wherein S2 comprises:

S21: placing, in a preset mold, the power supply line and the circuit board which are electrically connected; and S22: injecting molten plastic material into the mold, and cooling the molten plastic material in the mold for a preset time to solidity the molten plastic material, thereby forming the line tube that wraps around the power supply line and the case in which the circuit board and the illuminants are sealed.

18. The manufacturing method of the integrated injection-molded light according to claim 16, wherein S2 comprises:

S21': placing, in a preset mold, a bottom plate, and the power supply line and the circuit board which are electrically connected; and S22': injecting molten plastic material into the mold, and cooling the molten plastic material in the mold for a preset time to solidity the molten plastic material, thereby forming the line tube that wraps around the power supply line and cooperating with the bottom plate to form the case in which the circuit board and the illuminants are sealed.

19. The manufacturing method of the integrated injection-molded light according to claim 18, wherein an L-shaped positioning step is arranged on a side, facing the cover plate, of the bottom plate, and an outer edge of the circuit board is located on an inner side of the positioning step; or an inverted-L-shaped first clip is formed on the bottom plate, an L-shaped second clip is formed from a cover plate of the case during the forming process of the cover plate, and the first clip and the second clip are interlocked with each other.

20. The manufacturing method of the integrated injection-molded light according to claim 17, wherein the light further comprises electric connectors arranged at opposite ends of the power supply line, and multiple said light source modules are arranged between the electric connectors at intervals; the manufacturing method comprises:

performing S1 multiple times to fixedly connect the circuit boards of the multiple light source modules to the power supply line at intervals; and performing S2 multiple times to thereby form the cases and the lines tubes through injection molding one by one.

* * * * *